United States Patent [19]

Nakahara et al.

[11] Patent Number: 4,675,233

[45] Date of Patent: Jun. 23, 1987

[54] INK TRANSFER MATERIAL FOR PRINTER

[75] Inventors: Yasuzi Nakahara; Hideki Yamagishi; Shun-ichiro Kirimura, all of Otsu, Japan

[73] Assignee: Toray Industries, Inc., Tokyo, Japan

[21] Appl. No.: 720,241

[22] Filed: Apr. 5, 1985

[30] Foreign Application Priority Data

Apr. 13, 1984 [JP] Japan ................................ 59-72622

[51] Int. Cl.[4] ........................ B32B 27/06; B32B 27/36

[52] U.S. Cl. .................................... 428/323; 428/332; 428/336; 428/337; 428/480; 428/914

[58] Field of Search ..................... 428/480, 488.1, 323, 428/337, 332, 336, 914

[56] References Cited

U.S. PATENT DOCUMENTS 4,505,983 3/1985 Kuroda et al. ................... 428/488.1
4,510,206 4/1985 Shuman ........................... 428/488.1

FOREIGN PATENT DOCUMENTS 1003704 9/1965 United Kingdom ................ 428/480
1473076 5/1977 United Kingdom ............ 428/488.1
1534512 12/1978 United Kingdom ................ 428/480

*Primary Examiner*—Thomas J. Herbert
*Attorney, Agent, or Firm*—Armstrong, Nikaido, Marmelstein & Kubovcik

[57] ABSTRACT

An ink transfer material for printers which comprises a biaxially oriented polyester film and a transfer ink layer deposited on one side of the polyester film, the biaxially oriented polyester film having a thickness in the range of 1 to 15μ, an F-5 value in the longitudinal direction in the range of 11 to 16 kg/mm$^2$, a refractive index in each of the longitudinal and lateral directions in the range of 1.650 to 1.675, and a birefringence of not more than 0.02, and the rough surface having a center line average height thereof in the range of 0.02 to 1μ and a maximum height in the range of 0.2 to 10μ. This ink transfer material has no disadvantage such as longitudinal tear, plastic deformation, or thermal shrinkage. Thus, it is highly useful in thermal transfer printers and impact printers.

13 Claims, No Drawings

INK TRANSFER MATERIAL FOR PRINTER

BACKGROUND

This invention relates to an ink transfer material for printers, and more particularly to an ink transfer material which is excellent in dimensional stability and durability, virtually free from plastic deformation, and useful for typewriters and other similar impact printers and thermal transfer printers.

Polyester film is utilized as the substrate of an ink transfer material for printers because this film possesses outstanding properties such as high crystallinity, a high melting point, excellent thermostability and chemical resistance, high tensile and impact strengths, and high tensile modulus.

The ink transfer material, when used in impact printers such as typewriters, is required to endure tension and printing pressure and warrant repeated use. In thermal transfer printers, the extremely thin substrates are required to increase thermal conductivity. Therefore, the substrates for the ink transfer material are required to possess high tensile and impact strengths and small deformation including thermal shrinkage.

In the ink transfer material using an ordinary biaxially oriented polyester film as the substrate thereof, however, there often occurs problems of longitudinal elongation and plastic deformation in dotted parts during the transfer of ink, therefore it is unsatisfactory for a printer ribbon which is quite susceptible of high tension and high printing pressure.

The ink transfer material using the typical biaxially oriented polyester film available on the market is embossed under the impacts of printing types and, because of the prominent and persistent projections left in the film, is not smoothly rewound in the spool or the cassette of a limited capacity.

The plastic deformation or embossing is caused by the property of the film whereby it is distorted under impact pressure and does not return to be flat, after the impact pressure is released.

The ink transfer material for the thermal transfer printers is desired to be a good thermal conductivity and, therefore, is expected to use a thin substrate as far as possible. If the ordinary biaxially oriented polyester thin film available on the market is used as the substrate, it still fails to make a satisfactory ink transfer material for thermal transfer printers because of insufficient tensile strength.

When the ordinary tensilized polyester film whose F-5 value in the longitudinal direction exceeds 16 kg/mm$^2$ is used as the substrate of an ink transfer material for impact printers, the film is liable to sustain tear in the longitudinal direction during ink transfer by impact printer, and as the substrate of an ink transfer material for thermal printers, its thermal shrinkage is too large to make it useful.

SUMMARY

An object of this invention is to provide an ink transfer material which is excellent in dimensional stability and durability, free from the aforementioned drawbacks of the conventional ink transfer material, and useful for printers.

Another object of this invention is to provide an ink transfer material for printers, which is adequately strong, break-resistant and resistant to plastic deformation.

A still another object of this invention is to provide an ink transfer material for thermal transfer printers, which avoids the problem of thermal shrinkage and possesses enough strength to endure heat even in a reduced thickness.

A yet still another object of this invention is to provide an ink transfer material for printers, which has a high resolution and can produce clean and clear prints.

Namely, this invention relates to an ink transfer material for printers, comprising a biaxially oriented polyester film and a transfer ink layer deposited on one side of the polyester film, the biaxially oriented polyester film having a thickness in the range of 1 to 15$\mu$, an F-5 value in the longitudinal direction in the range of 11 to 16 kg/mm$^2$, refractive indices in each of the longitudinal and lateral directions in the range of 1.650 to 1.675, and a birefringence of not more than 0.02, possessing a rough surface on at least one side thereof, and the rough surface having a center line average height thereof in the range of 0.02 to 1$\mu$ and a maximum height in the range of 0.2 to 10 $\mu$.

THE PREFERRED EMBODIMENTS

By the term "polyester" as used in this invention is meant a thermoplastic linear polyester as well known to the art. Desirably, this polyester is a polymer selected from the group consisting of polyethylene terephthalate, polyester copolymers having ethylene terephthalate units as main repeating component units thereof, and polymer blends having such polyesters as main components thereof.

As well known by skilled in the arts, a thermoplastic linear polyester is obtained by the polycondensation of (A) a dicarboxylic acid or an ester-forming derivative thereof with (B) a glycol. It is desired that at least 80 mol % of the component (A) is a terephthalic acid or an ester-forming derivative thereof and at least 80 mol % of the component (B) is ethylene glycol.

Especially, polyethylene terephthalate homopolymer is used most widely.

In the case of a polymer blend, it is preferable to contain not less than 80% by weight of the aforementioned polyester. The polyester to be used in this invention may contain various additives such as thermal stabilizer, coloring agent, antioxidant, and lubricant.

The polyester film to be used in this invention is a biaxially oriented film of the aforementioned polyester. This film is required to have an F-5 value in the longitudinal direction thereof in the range of 11 to 16 kg/mm$^2$, preferably 11.5 to 15 kg/mm$^2$. If the F-5 value is less than 11 kg/mm$^2$, the film is readily stretched and exhibits poor elastic recovery and, as used in an ink transfer material for impact printers, it is undesirable because of plastic deformation.

Namely, when the biaxially oriented polyester film has an F-5 value of less than 11 kg/mm$^2$ in the longitudinal direction, it cannot be rewound in the space available on the rewind reel or in the space of the cassette having a limited capacity resulting from excessive embossing of the film where it is struck by the typewriter keys.

When the film of the foregoing description is used for thermal transfer printers, it is used in a reduced thickness to ensure better heat-conductivity. The decrease of the thickness brings the decrease of the strength of the film, therefore, the obtained ink transfer material tends to be ruptured.

If the F-5 value exceeds 16 kg/mm$^2$, the film becomes too rigid, so it tends to tear under the impact of printing types, or undergoes serious thermal shrinkage under the thermal transfer printing.

The refractive indices of the film, both in the longitudinal and lateral directions, is required to fall into the range of 1.650 to 1.675, preferably 1.655 to 1.670. If the refractive indices are less than 1.650, the film possesses insufficient strength and, therefore, deformed under the impact of printing types. If the refractive indices exceed 1.675, the film tends to tear under the impact of printing types or yields readily to thermal shrinkage under the thermal transfer printing.

The birefringence of the film is required to be not more than 0.02, preferably 0.015. If the birefringence exceeds 0.02, the balance of mechanical properties in the longitudinal and lateral directions of the film is lost and the drawbacks mentioned above comes out.

The thickness of the polyester film to be used in this invention is required to fall into the range of 1 to 15μ, preferably 2 to 10μ. If the thickness exceeds the upper limit of the range defined above, the film no longer suits high-speed recording because the resolution of the printed matter or thermal conduction becomes insufficient. If the thickness is out of the lower limit of the range, tensile and impact strength of the film is insufficient and operation for application of the ink transfer layer onto the film becomes difficult.

The polyester film of the present invention has a rough surface at least one side thereof. The roughness of said rough surface is such that the center line average height (Ra) thereof is required to fall into the range of 0.02 to 1μ, preferably 0.04 to 0.8μ, and the maximum height (Rmax) to fall in the range of 0.2 to 10μ, preferably 0.4 to 8μ. If the magnitudes of Ra and Rmax are out of the lower limits of the respective ranges, slipperiness of the film becomes poor, the film tends to wrinkle, and stick to the thermal head in the thermal printer. If they exceed the upper limits, it impairs resolution, impedes uniform transfer of ink, and accelerates wear of the thermal head. The aforementioned surface roughness can be attained by a proper method known to the art, for example, addition of inorganic or organic particles to the polymer composition for forming the film, acceleration of crystallization of the melt extruded film, or surface treatment of the film such as sand blasting, chemical etching and mat coating. Particularly the addition of inorganic particles of an average particle diameter within the range of 0.02 to 20μ, preferably 0.05 to 10μ in an amount of 0.05 to 5% by weight to the polymer composition is preferable.

Now, the manufacturing method of the ink transfer material of this invention will be described below.

The biaxially oriented film to be used in the present invention is produced generally by stretching an extruded sheet first in the longitudinal direction and then in the lateral direction and optionally restretching the film in the longitudinal direction. In this first longitudinal stretching, there is employed the so-called multistage longitudinal process which effects the required stretching in two or more separate zones.

To be more specific, the biaxially oriented polyester film is obtained by first melting polyester, extruding the molten polyester in the form of a sheet through a slit die, cooling and solidifying the extruded unstretched sheet on a cooling drum, stretching the sheet longitudinally in a multi-stage, i.e. heating the sheet to a temperature in the range of 80° to 130° C. and stretching the sheet in two or more zones at a total stretching ratio in the range of four to seven times the original length by virtue of suitably varied peripheral speeds of rolls then laterally stretching the sheet at a temperature in the range of 90° to 130° C. at a ratio of 3.0 to 4.5, and subjecting the stretched sheet to a heat treatment at a temperature in the range of 180° to 240° C., preferably 200° to 230° C. Optionally, the biaxially oriented polyester may be obtained by inserting after the step of the lateral stretching in the procedure described above a re-stretching in the longitudinal direction at a temperature in the range of 90° to 130° C., preferably 95° to 110° C., at a stretching ratio of not more than 1.10 times, preferably not more than 1.05 times to the length before the treatment, and subjecting heat treatment mentioned above.

Incidentally, the polyester film which is produced by the sequential longitudinal-lateral biaxial stretching method described as in U.S. Pat. No. 2,823,421 or British Pat. No. 838,708 generally possesses higher orientation to the lateral direction under the influence of the lateral stretching which follows the longitudinal stretching. As the result, this film acquires a refractive index of this film becomes less than 1.650 in the longitudinal direction and an F-5 value becomes less than 11 kg/mm$^2$. If, on the other hand, the ratio of stretching is greater in the longitudinal direction than in the lateral direction, then the uniformity of stretching becomes poor and it causes thickness variation. The so-called tensilized polyester film having enhanced orientation in the longitudinal direction which is produced by the longitudinal-lateral-longitudinal three-stage stretching method described in British Patent No. 811,066 and the lateral-longitudinal stretching method described in Japanese Patent Publication No. 37-1588 proves to be undesirable because it has an F-5 value in the longitudinal direction in excess of 16 kg/mm$^2$, a refractive index in the lateral direction below 1.650, and a birefringence exceeding 0.02.

Then, a transfer ink layer is formed on the biaxially oriented polyester film of the present invention obtained as described above.

The biaxially oriented polyester film may be subjected, when necessary, to a surface treatment as by means of corona discharge in air or in an inert gas, to a frame treatment or a reverse spattering treatment. It may be given an undercoating layer.

The polyester film of this invention is desired, though not essentially, to possess specific surface resistivity of not more than $10^{15}$ ohm/sq., preferably $10^{13}$ ohm/sq., so as to preclude the problems of electrostatic deposition of dust on the film surface, unsmooth movement of the film, and infliction of damage to the electric circuit of the printer.

To obtain the polyester film having specific surface resistivity of not more than $10^{15}$ ohm/sq., there may be suitably adopted a method such as an application of an antistatic agent on the film surface, a method forming a thin layer of a metal or a metal compound on the film surface, a method adding an antistatic agent to the composition of raw monomers at the stage of polymerization prepared for the formation of film, or a method mixing the polyester with an antistatic agent prior to the formation of the film. For example, a method which comprises adding an anionic surfactant (such as, for example, sodium alkylbenzene sulfonate or sodium alkyl sulfonate) and a polyalkylene glycol to the raw material for the polyester before the stage of polycondensation, subjecting the resultant mixture to polycondensation, and blending the resultant polyester with a film-grade polyester is recommended.

The transfer ink to be used in the ink transfer material of this invention is not specifically defined. Any of the transfer inks known as available for use in impact printers or thermal transfer printers can be used. To be specific, the transfer ink is composed of a binder and a coloring agent as main ingredients and, optionally, other additives such as softening agent, plasticizer, melting point regulator, lubricant, and dispersant. In short, it is produced by suitably combining materials known to the art.

Examples of the main ingredients include well-known waxes such as paraffin wax, carunauba wax, and ester wax or various high molecular compounds of low melting points as binders and carbon black, various organic and inorganic pigments, and dyes as coloring components. Optionally, the ink to be selected may be of a sublimating type.

The deposition of the transfer ink layer on one of the surfaces of the film of this invention can be accomplished by any of the known methods. Examples of the method include a method of applying the ink in the form of a hot melt or solvent coating process such as gravure roll, reverse roll, or the slit die.

In the case of the ink transfer material for the thermal transfer printers, the film may be provided on the opposite side of the transfer ink layer with a fusionproofing layer for the purpose of preventing the material from sticking to the thermal head, if necessary.

Examples of the fusionproofing agent having good thermostability include silicone resin, melamine resin, fluorine resin, epoxy resin, and phenol resin. The fusionproofing agent comprising a mixture of (A) having high lubricity and releasability such as wax, higher fatty acid amide, or higher alcohol with (B) a thermoplastic resin such as acrylic resin, polyester resin, cellulose type resin, or vinyl chloride-vinyl acetate copolymer are also usable.

Since the ink transfer material of the present invention comprises a specific polyester film and a transfer ink layer deposited on the polyester film, it avoids sustaining tear in the longitudinal direction under the impact of printing types and yields only minimally to plastic deformation after exposure to the impact of printing types, and excels in durability.

Thus, the ink transfer material of this invention can improve the disadvantage of the difficulty to rewind on a spool or the cassette of a limited capacity.

The ink transfer material of this invention, when used for thermal transfer printers, brings about the advantage that the polyester film has high strength enough to permit an ample reduction in the thickness as compared with the ink transfer material using an ordinary biaxially oriented polyester film, the material enjoys improved heat conductivity, and has less thermal shrinkage than the ink transfer material using a tensilized polyester film.

Moreover, since the polyester film possesses specific surface roughness, the ink transfer material avoids sticking to the thermal head, moves smoothly in the printer interior, permits smooth rewinding within the spool, and produces printed images of high clarity. Owing to the outstanding properties shown above, the ink transfer material of this invention permits miniaturization as required for incorporation in small cases such as cassettes. Therefore, it is highly useful as an ink transfer material of the types as the small cassettes. (Measuring methods for determination of properties and standards for evaluation)

The measuring methods used for the determination of properties defined by this invention are as follows:

(1) F-5 value (tensile stress at the elongation of 5%):

On a tensile tester of Instron type according with ASTM D-882, a specimen having 10 mm of width and 100 mm of length is set. Under the conditions of 200 mm/min. of stretching speed, 20° C. of temperature, and 65% RH of humidity, the sample is stretched by 5%. The strength of the stretched sample is measured.

(2) Refractive index:

In an Abbe refractive index meter fitted with an analyzer. The refractive index in the longitudinal and lateral directions of the sample is measured with a sodium D ray at room temperature and under normal atmospheric pressure (20±2° C. and 65% RH).

[The principle of determination is described in Journal of Applied Polymer Science, Vol. 8, page 2717 (1964)].

(3) Birefringence:

Under a polarizing microscope fitted with a Berek compensator, a sodium D ray is projected perpendicularly upon the surface of a specimen and retardation is measured under the conditions of room temperature and normal atmospheric pressure (20±2° C., 65% RH). The birefringence is calculated by dividing the value of retardation by the thickness of the sample.

(4) Surface roughness:

Center line average height (Ra) and the maximum height of rough surface (Rmax) are determined by the method defined in DIN 4768.

(Example)

Now, the preferred embodiment of the present invention will be described below with reference to working examples. Wherever "parts" mentioned, they are meant as "parts by weight".

EXAMPLES 1-3 AND COMPARATIVE EXAMPLES 1-2

Polyethylene terephthalate having an inherent viscosity of 0.61 as measured in a O-chlorophenol solution at 35° C. and containing 0.2% by weight of calcium carbonate particles having 3.0μ in average particle diameter was melt extruded through a T-die attached to the exit of an extruder. The extruded sheet was quenched on a water-cooled casting drum. It was solidified and an amorphous sheet 70 to 120μ in thickness was obtained. Samples of this sheet were stretched by the three methods A, B, and C indicated below and subjected to a heat treatment, to produce biaxially oriented films A, B and C.

Method A: Stretching by a multi-stage stretching device adapted to perform a three-stage longitudinal stretching, comprising the first stage at a temperature of 80° C. and a stretching ratio of 2.1 times, the second stage at a temperature of 100° C. and a stretching ratio of 1.1 times, and the third stage at a temperature of 125° C. and a stretching ratio of 2.6 times, giving a total stretching ratio of 6.0 times. In a tenter oven, the film was stretched laterally at 120° C. at a stretching ratio of 3.5 times, then subjected to a heat set at 220° C., cooled, and wound.

Method B: In the same device as in Method A, a two-stage longitudinal stretching was carried out, comprising the first stage involving only application of heat and no stretching, the second stage at a temperature of 110° C. and a stretching ratio of 1.9 times, and the third stage at a temperature of 115° C. and a stretching ratio of 2.4 times, giving a total stretching ratio of 4.6 times. Thereafter, under the same condition as those of Method A, the film was laterally stretched, subjected to a heat set, cooled, and rewound.

Method C: The procedure of Method B was followed to perform a two-stage longitudinal stretching. Then, in a tenter oven, the film was subjected to lateral stretching at a temperature of 110° C. and a stretching ratio of 3.5 times, and re-stretching longitudinally at a temperature of 100° C. at a stretching ratio of 1.02 times, subjected to a heat set at 220° C., cooled, and wound.

The properties of the three films were measured as mentioned above. The results are shown in Table 1.

For comparison, an ordinary sequential biaxially oriented polyester film D was obtained by longitudinal stretching at a temperature of 95° C. and a stretching ratio of 3.6 times, lateral stretching at a temperature of 110° C. and a stretching ratio of 3.2 times, and a heat set at 225° C. Separately, a longitudinally tensilized polyester film E was obtained by longitudinal stretching at a temperature of 90° C. and a stretching ratio of 2.75 times, lateral stretching at a temperature of 100° C. and a stretching ratio of 3.4 times, and again longitudinal stretching at a temperature of 130° C. and a stretching ratio of 2.0 times, a heat set at 215° C.

The properties of these films so produced were measured as mentioned above. The results are shown in Table 1.

Then, on the samples of the aforementioned films A, B, and C and the comparative films D and E, a layer of a copolymer of methyl methacrylate and butyl acrylate was deposited in a thickness of 2μ and a layer of a composition of the following components was superposed in a thickness of 10μ (as solids) and dried to form an impact transfer ink layer.

| | Parts |
|---|---|
| Vinyl chloride-vinyl acetate copolymer (87%/13%) | 10 |
| Lanolin | 6 |

-continued

| | Parts |
|---|---|
| Vegetable oil | 4 |
| Carbon black | 5 |
| Toluene | 25 |
| Methyl ethyl ketone | 50 |

Meanwhile, on the polyester films A, B, C, D, and E, a composition of the following components as thermal transfer ink layer was applied by the hot melt coating method using a heated roll in a thickness of 5 μ.

| | Parts |
|---|---|
| Canauba wax | 30 |
| Ester wax | 35 |
| Carbon black | 12 |
| Polytetrahydrofuran | 10 |
| Silicone oil | 3 |

The films A, B, and C having the transfer ink applied thereon represent Examples 1, 2, and 3 respectively and the films D and E having the transfer ink applied therein represent Comparative Examples 1 and 2 respectively.

The transfer materials so produced were tested in a dot impact type printer and a thermal transfer type printer.

The transfer materials using the films A, B, and C of this invention as substrates, namely, Examples 1-3, produced prints of very fine quality.

In contrast, the transfer material using the substrate D, namely Comparative Example 1, had heavy plastic deformation in the test with the dot impact type printer. The same transfer material, in the test with the thermal transfer printer, produced sag due to insufficient strength. The transfer material using the substrate E, namely Comparative Experiment 2, teared under the impact of printing types. The thermal transfer material using the substrate E, in the test with the thermal transfer printer, deformed so seriously because of thermal shrinkage and could not be moved through the printer.

TABLE 1

| Item | | Division | | | | |
|---|---|---|---|---|---|---|
| | | Example | | | Comparative Example | |
| | | Film | | | | |
| | | A | B | C | D | E |
| Thickness (μ) | | 5.7 | 6.1 | 5.8 | 6.0 | 6.9 |
| F-5 value, MD | | 13.0 | 11.8 | 12.3 | 10.2 | 18.3 |
| ($kg/mm^2$) TD | | 10.7 | 10.5 | 10.2 | 10.5 | 12.0 |
| Refractive index | | | | | | |
| MD | | 1.6628 | 1.6580 | 1.6620 | 1.6471 | 1.6725 |
| TD | | 1.6602 | 1.6598 | 1.6551 | 1.6730 | 1.6364 |
| Birefringence | | 0.0030 | 0.0018 | 0.0082 | 0.0263 | 0.0364 |
| Surface roughness | Center line average height (μ) | 0.14 | 0.15 | 0.10 | 0.16 | 0.08 |
| | Maximum height (μ) | 1.13 | 1.28 | 0.90 | 1.15 | 0.80 |

Note
MD: Longitudinal direction
TD: Lateral direction

COMPARATIVE EXAMPLE 3

One side of a biaxially oriented film 8μ in thickness obtained by following the procedure of Method A of Example 1 was roughened by the sand mat treatment.

On the other side of the film, a transfer ink layer of the same composition for thermal transfer printing as in Example 1 was superposed. The roughness of the matted surface in the center line average height was 1.1μ and the maximum height was 12.5μ. When the ink transfer material so produced was used in a thermal transfer printer, the ink could not transfer uniformly and it produced prints lacking clarity.

We claim:

1. An ink transfer material for printers, comprising a biaxially oriented polyester film and a transfer ink layer deposited on one side of said polyester film, said biaxially oriented polyester film having a thickness in the range of 1 to 15μ, and F-5 value in the longitudinal direction in the range of 11 to 16 $kg/mm^2$, refractive indices in each of the longitudinal and lateral directions in the range of 1.650 to 1.675, and a birefringence of not more than 0.02, possessing a rough surface on at least one side thereof, and said rough surface having a center line average height in the range of 0.02 to 1μ and a maximum height in the range of 0.2 to, 10μ.

2. An ink transfer material according to claim 1, wherein said biaxially oriented polyester film contains 0.05 to 5% by weight of inorganic particles having an average particle diameter in the range of 0.02 to 20μ.

3. An ink transfer material according to claim 1, wherein said biaxially oriented polyester film has a thickness in the range of 2 to 10 μm.

4. An ink transfer material according to claim 1, wherein the F-5 value in the longitudinal direction of said biaxially oriented polyester film falls in the range of 11.5 to 15 $kg/mm^2$.

5. An ink transfer material according to claim 1, wherein the refractive index in each of the longitudinal and lateral directions of said biaxially oriented polyester film falls in the range of 1.655 to 1.670.

6. An ink transfer material according to claim 1, wherein the birefringence of said biaxially oriented polyester film is not more than 0.015.

7. An ink transfer material according to claim 1, wherein the center line average height of said rough surface of said biaxially oriented polyester film falls in the range of 0.04 to 0.8μ.

8. An ink transfer material according to claim 1, wherein the maximum height of the coarse surface of said biaxially oriented polyester film falls in the range of 0.4 to 8μ.

9. An ink transfer material according to claim 1, wherein said transfer material is for use in a thermal transfer printer.

10. An ink transfer material according to claim 1, wherein said transfer material is for use in an impact printer.

11. An ink transfer material according to claim 1, wherein the polyester is a thermoplastic linear polyester.

12. An ink transfer material according to claim 11, wherein said thermoplastic polyester is the polycondensation products of (A) a dicarboxylic acid or an ester-forming derivative thereof with (B) a glycol, and at least 80 mol % of said component (A) is a terephthalic acid or an ester-forming derivative thereof and at least 80 mol % of said component (B) is ethylene glycol.

13. An ink transfer material according to claim 11, wherein said thermoplastic linear polyester is polyethylene terephthalate.

* * * * *